Oct. 26, 1954
J. B. NICHOLS ET AL
2,692,800
NOZZLE FLOW CONTROL
Filed Oct. 8, 1951
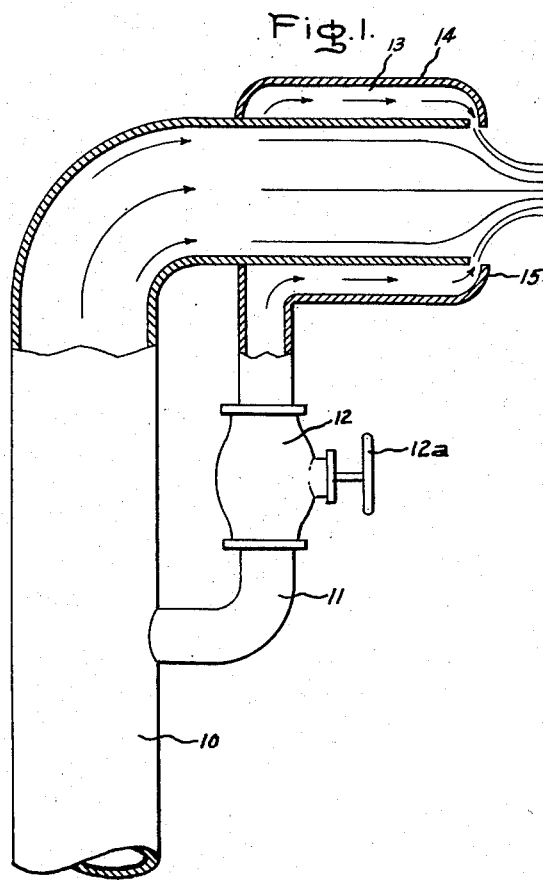
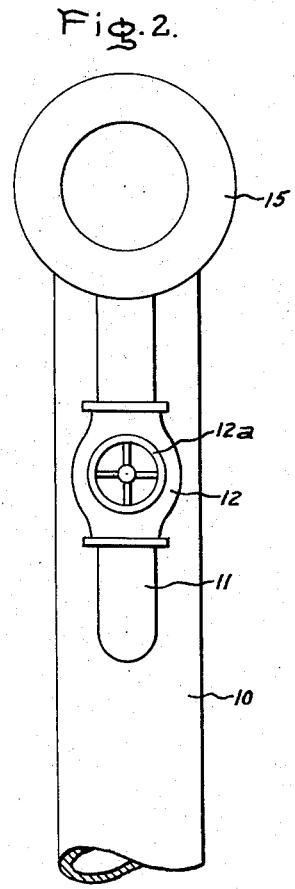
Inventors:
John B. Nichols,
William E. Wayman,
by Paul A. Frank
Their Attorney.

Patented Oct. 26, 1954

2,692,800

UNITED STATES PATENT OFFICE 2,692,800

NOZZLE FLOW CONTROL

John B. Nichols, Schenectady, N. Y., and William E. Wayman, Los Angeles, Calif., assignors to General Electric Company, a corporation of New York Application October 8, 1951, Serial No. 250,352

4 Claims. (Cl. 299—140)

1

This invention relates to a device for controlling the flow of fluid through a nozzle. More particularly, it relates to a fluid flow control device which utilizes the energy contained in a stream of fluid to control the rate of flow of fluid through the nozzle.

Where fluid from a source under constant pressure is passed through a nozzle, it is customary to control the rate of flow of fluid through the nozzle by means of a mechanical valve. Where fluid flow takes place in applications such as jet engine tail cones, it is highly desirable to avoid subjecting moving parts to the action of hot gases.

It is an object of this invention to provide a fluid flow control device in which no mechanical parts are necessary in the vicinity of the nozzle.

It is another object of this invention to provide a fluid flow control device in which the energy contained in the fluid itself is utilized to control the rate of flow thereof.

Another object of this invention is to provide a flow control device wherein a stream of fluid passes through two passageways, one of which is utilized to control the rate of flow of fluid through the other.

A still further object of the invention is to provide a flow control device in which the area of the vena contracta is varied by an auxiliary fluid stream.

Other objects will become apparent and the invention better understood from a consideration of the following description taken in conjunction with the accompanying drawing wherein:

Fig. 1 is a view partly in section of a nozzle constructed in accordance with this invention; and Fig. 2 is a side view of the device illustrated in Fig. 1.

In accordance with this invention, a main fluid-flow passageway is surrounded by a control-flow passageway having a nozzle annularly positioned with respect to the main flow passageway in such a manner that fluid flowing through the control flow passageway is directed inwardly toward the main flow. The force of the fluid entering through the control flow passageway restricts the area of the vena contracta of the main flow passageway, thereby controlling its rate of flow.

Referring to the drawing, a main flow pipe 10 is connected to a source of fluid (not shown). The main flow pipe 10 preferably has smooth walls. Fluid, which may be either gaseous or liquid, flows through the pipe 10 in the direction indicated by the arrows.

Extending outward from the pipe 10 is a control flow pipe 11 which passes through a flow control valve 12 having a manual control 12a. The flow control pipe 11 terminates in an annular flow control passageway 13 surrounding the main flow pipe 10 near the outlet thereof as best shown in Fig. 1. The flow passageway 13 is defined by the annular wall 14, which terminates at its outlet end in an inwardly directed annular nozzle 15.

The flow of fluid is indicated by the plurality of arrows shown on the drawing. In the embodiment illustrated, the control flow passageway utilizes fluid from the same source as the main flow passageway. In operation, fluid entering the main flow pipe 10 divides, a portion entering the flow control pipe 11. The proportion of fluid entering the control pipe 11 is set by manual manipulation of the control 12a of the valve 12. If the valve 12 is opened to full position, the maximum amount of fluid will flow through the control pipe 11 and into the annular passageway 13. In this event, a large volume of fluid passes through the nozzle 15 which is arranged to pass fluid entering from the passageway 13 substantially at right angles to the fluid flow through the main flow passageway. The control fluid decreases the area of the vena contracta of the main flow, as shown by the arrows at the fluid exit, thereby slowing up the rate of flow. As the handle 12a is turned to reduce the flow of fluid through the valve 12, the vena contracta of the main flow enlarges, thereby enabling a larger volume of fluid to flow through the main flow pipe 10. The maximum flow of fluid takes place when the valve 12 is completely closed.

With the flow control nozzle illustrated, I have calculated the ratio of maximum flow to minimum flow in the main flow passageway to be as great as 10 to 1, even though the pressure at the source was held constant. This was the case where the flow control pipe was connected in parallel with the main flow pipe. Obviously, a separate source of fluid at a still higher pressure could be utilized in the flow control pipe in order to throttle the flow through the main pipe still further.

It is to be noted that only a portion of the fluid flows through the control valve 12, thereby enabling a much smaller valve to be used for control purposes than would be possible if the valve had to be positioned in the main fluid flow pipe 10. The valve 12 may be placed anywhere in the control line 11, thereby providing control from a remote position over the flow of fluid through the pipe 10.

The valve 12 cannot be used to stop the flow of fluid through the nozzle. An additional valve (not shown) is connected in the line for this purpose. The additional valve may be of a type which is either entirely open or entirely closed since it is not used to adjust the rate of flow.

While we have described our invention with reference to a single embodiment thereof, it is to be understood that our invention is limited in scope only to the extent that the appended claims also are limited in scope.

What we claim as new and desire to secure by Letters Patent of the United States is:

1. A flow control device comprising a main flow passageway, and a control flow passageway opening off of said main flow passageway positioned in annular relationship to the outlet of said main flow passageway, said control flow passageway terminating in an annular nozzle directed inwardly toward the center of said main flow passageway outlet whereby the energy contained in a fluid flowing in said control flow passageway is utilized to control the rate of fluid flow in said main flow passageway.

2. A flow control device comprising a main flow passageway, a control flow passageway opening off said main flow passageway positioned in annular relationship with the outlet of said main flow passageway, said control flow passageway terminating in an annular nozzle directed inwardly toward the center of said main flow passageway outlet whereby the energy contained in a fluid flowing in said control flow passageway is utilized to control the rate of fluid flow in said main flow passageway, and means for varying the rate of fluid flow through said control flow passageway.

3. A method of utilizing the energy in a flowing fluid stream to control the rate of flow of the stream which comprises dividing the stream into a main flow and a control flow, positioning the control flow in exterior annular relationship to the outlet of the main flow with the control flow directed toward the center of the main flow, and varying the rate of control flow to vary the rate of the main flow.

4. A flow control device as claimed in claim 1 wherein the control passageway is smaller than the main flow passageway.

References Cited in the file of this patent

UNITED STATES PATENTS

| Number | Name | Date |
|---|---|---|
| 1,864,647 | Geer | June 28, 1932 |
| 1,934,837 | Zulver | Nov. 14, 1933 |
| 2,257,691 | Keep | Sept. 30, 1941 |
| 2,503,723 | Gothard | Apr. 11, 1950 |
| 2,551,114 | Goddard | May 1, 1951 |
| 2,626,188 | Dalrymple | Jan. 20, 1953 |

FOREIGN PATENTS

| Number | Country | Date |
|---|---|---|
| 29,349 | Great Britain | Dec. 15, 1909 |